(12) United States Patent
Sohoni

(10) Patent No.: US 10,319,079 B2
(45) Date of Patent: Jun. 11, 2019

(54) NOISE ESTIMATION USING BRACKETED IMAGE CAPTURE

(71) Applicant: Microsoft Technology Licensing, LLC, Redmond, WA (US)

(72) Inventor: Sudhanshu Sohoni, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 5 days.

(21) Appl. No.: 15/639,531

(22) Filed: Jun. 30, 2017

(65) Prior Publication Data

US 2019/0005623 A1 Jan. 3, 2019

(51) Int. Cl.
*G06T 5/00* (2006.01)
*H04N 5/217* (2011.01)
*H04N 5/235* (2006.01)
*H04N 5/243* (2006.01)

(52) U.S. Cl.
CPC ............. *G06T 5/002* (2013.01); *H04N 5/217* (2013.01); *H04N 5/2356* (2013.01); *H04N 5/243* (2013.01); *G06T 2207/20024* (2013.01); *G06T 2207/20182* (2013.01)

(58) Field of Classification Search
CPC .................................................... G06T 5/002
See application file for complete search history.

(56) References Cited

U.S. PATENT DOCUMENTS

| 8,711,248 | B2 | 4/2014 | Jandhyala et al. |
| 9,077,913 | B2 | 7/2015 | Hasinhoff et al. |
| 9,270,875 | B2 | 2/2016 | Brisedoux et al. |
| 9,438,809 | B2 | 9/2016 | Sheikh et al. |
| 9,578,259 | B2 | 2/2017 | Molina |
| 2009/0285504 | A1* | 11/2009 | Li ............................. G06K 9/40 382/275 |
| 2010/0066874 | A1* | 3/2010 | Ishiga ..................... G06T 5/002 348/252 |
| 2010/0111436 | A1* | 5/2010 | Jung ........................ G06K 9/40 382/263 |
| 2014/0064610 | A1* | 3/2014 | Matsushima ............ G06K 9/36 382/162 |

(Continued)

OTHER PUBLICATIONS

Arun, et al., "Hand-Held Low-Light Photography with Exposure Bracketing", In Proceedings of International Conference on Image Processing, Sep. 2016, 6 pages.

(Continued)

*Primary Examiner* — David F Dunphy
(74) *Attorney, Agent, or Firm* — Arent Fox LLP

(57) ABSTRACT

Methods and devices for reducing noise in an image may include receiving an in focus image and at least one out of focus image of a scene, wherein the out of focus image has a second value of at least one focus-related parameter offset from a first value of the at least one focus-related parameter used for the in focus image. The methods and devices may include estimating a noise model of noise in at least a section of the out of focus image, and determining at least one parameter value for a filter based on the noise model. The methods and devices may include generating a noise-reduced image by applying the filter with the at least one parameter value to the in focus image to reduce at least part of the noise from at least a corresponding section of the in focus image.

22 Claims, 6 Drawing Sheets

(56) References Cited

U.S. PATENT DOCUMENTS

| | | | |
|---|---|---|---|
| 2014/0240512 A1* | 8/2014 | Hogasten | H04N 5/2257 |
| | | | 348/164 |
| 2015/0312463 A1 | 10/2015 | Gupta et al. | |
| 2015/0312489 A1 | 10/2015 | Hoelter et al. | |
| 2016/0309133 A1 | 10/2016 | Laroia et al. | |
| 2018/0114297 A1* | 4/2018 | Chuang | G06T 5/002 |

OTHER PUBLICATIONS

Rehman, et al., "Multi-Scale Pixel-Based Image Fusion Using Multivariate Empirical Mode Decomposition", In Journal of Sensors, vol. 15, May 8, 2015, pp. 10923-10947.

"International Search Report and Written Opinion Issued in PCT Application No. PCT/US2018/034519", dated Aug. 30, 2018, 13 Pages.

* cited by examiner

NOISE ESTIMATION USING BRACKETED IMAGE CAPTURE

BACKGROUND

The present disclosure relates to image and video capture.

Generally, when an image is captured in low light, imaging devices may keep the shutter open a longer time (relative to normal lighting conditions) to capture the image, which may result in a blurry image. In addition, when an image is captured in low light, imaging devices may increase the ISO (e.g., film speed rating per the International Organization of Standardization) to allow the imaging device to capture more light, which may also increase an amount of digital noise included in the image. As such, images captured in low lighting conditions may be out of focus and/or include additional noise in the image.

Thus, there is a need in the art for improvements in image and video capture.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a computer device. The computer device may include a memory to store data and instructions, a processor in communication with the memory, an operating system in communication with the memory and processor. The operating system may be operable to receive an in focus image and at least one out of focus image of a scene, wherein the out of focus image has a second value of at least one focus-related parameter offset from a first value of the at least one focus-related parameter used for the in focus image, estimate a noise model of noise in at least a section of the out of focus image, determine at least one parameter value for a filter based on the noise model, and generate a noise-reduced image by applying the filter with the at least one parameter value to the in focus image to reduce at least part of the noise in at least a corresponding section of the in focus image.

Another example implementation relates to a method for reducing noise in an image. The method may include receiving, at an operating system executing on a computer device, an in focus image and at least one out of focus image of a scene, wherein the out of focus image has a second value of at least one focus-related parameter offset from a first value of the at least one focus-related parameter used for the in focus image. The method may also include estimating, by the operating system, a noise model of noise in at least a section of the out of focus image. The method may also include determining at least one parameter value for a filter based on the amount of noise. The method may include generating a noise-reduced image by applying the filter with the at least one parameter value to the in focus image to reduce at least part of the noise in at least a corresponding section of the in focus image.

Another example implementation relates to computer-readable medium storing instructions executable by a computer device. The computer-readable medium may include at least one instruction for causing the computer device to receive an in focus image and at least one out of focus image of a scene, wherein the out of focus image has a second value of at least one focus-related parameter offset from a first value of the at least one focus-related parameter used for the in focus image. The computer-readable medium may include at least one instruction for causing the computer device to estimate a noise model of noise in at least a section of the out of focus image. The computer-readable medium may include at least one instruction for causing the computer device to determine at least one parameter value for a filter based on the amount of noise. The computer-readable medium may include at least one instruction for causing the computer device to generate a noise-reduced image by applying the filter with the at least one parameter value to the in focus image to reduce at least part of the noise in at least a corresponding section of the in focus image.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

Figure 1:
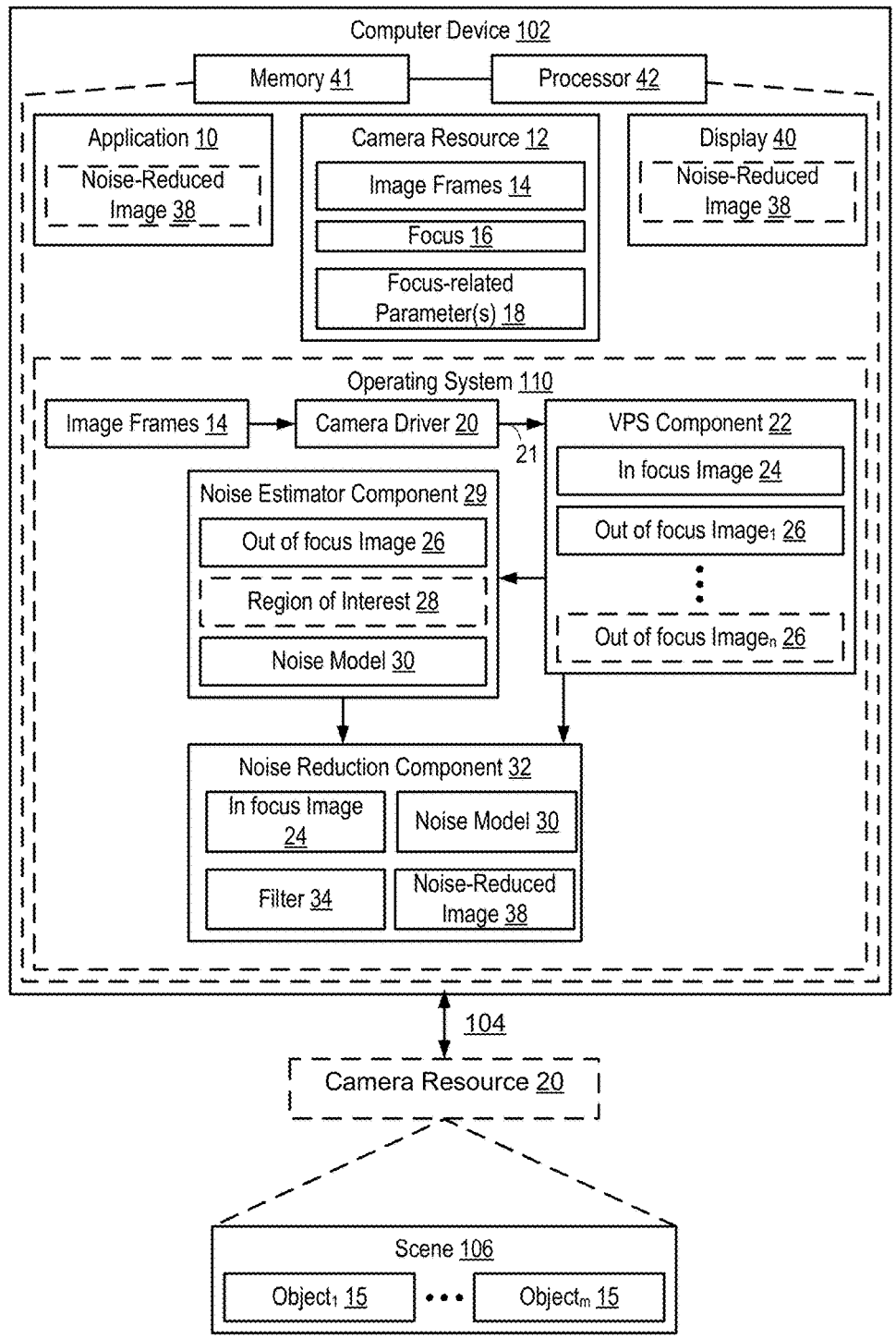
FIG. 1 is a schematic block diagram of an example computer device in accordance with an implementation of the present disclosure.

This disclosure relates to devices and methods for identifying noise in an out of focus image and removing or reducing the identified noise from a corresponding in focus image. Noise in an image typically has a high frequency, as do features of interest in the real world in the image. The present solution intentionally offsets one or more focus-related parameters of the in focus image in order to obtain an out of focus image. Since the real world features are not present (e.g., are out of focus) in the out of focus image, all or some portion of the remaining high frequency components may then be considered as noise in the image. Correspondingly, a filter can be configured based on this identified noise in the out of focus image, and then the filter can be applied to the in focus image to reduce or eliminate the identified noise. In an implementation, the images may be captured in low lighting conditions, resulting in additional noise included in the captured image due to, for example, an increase in the ISO (e.g., film speed) of the camera resource.

In an implementation, the methods and devices may capture multiple frames (e.g., images) of a scene and may vary the parameters (e.g., exposure and/or focus) for each captured frame in order to obtain one or more sets of an in focus image and a corresponding, intentionally out of focus image. The noise measurement and/or estimation may be based on a noise model of the out of focus second image. Once the noise in the out of focus image has been measured and/or estimated, a filter may be set with parameter values based on the noise model, and the filter applied to the in focus image to remove and/or reduce the identified noise. Thus, the resulting, noise-reduced filtered image may be provided to a camera application.

In an implementation, the noise may be measured and/or estimated in one or more regions of interest or sections of the out of focus image. For example, the camera resource may focus on a region of interest and the noise may be measured in the region of interest. In another implementation, the out of focus image may be divided into sections and for each section, the noise may be measured and/or estimated and a respective filter (based on a respective measured/estimated noise model for the section) may be applied to each corresponding section of the in focus image frame. As such, the removal or reduction of noise from different regions or sections of the in focus image may vary based on the measured/estimated noise model for each region or section.

In addition, in an implementation, the noise in the out of focus image may be measured and/or estimated using a frequency analysis to determine a pixel intensity variance in the out of focus image frame. For example, a frequency transform may be applied to the out of focus image to determine noise components (e.g., frequency components and/or amplitudes) of the noise in the out of focus image. A filter configured to apply an inverse of the detected noise components may be applied to the in focus image to remove and/or reduce the noise detected.

As such, a reduced-noise image (e.g., a clearer image without noise or with a reduced amount of noise) may be provided to a camera application.

Referring now to FIG. 1, a computer device 102 for processing images to remove and/or reduce noise in captured images may include one or more applications 10 executed or processed by processor 42 and/or memory 41 of computer device 102. Applications 10 may use one or more camera resources 12 on computer device 102, and/or in communication with computer device 102 via a wired or wireless connection 104, to capture images of a scene 106. In addition, applications 10 may process and/or use images captured by camera resources 12.

Camera resource 12 may capture a video and/or still picture of scene 106 that may be presented on a display 40. Display 40 may be located on computer device 102 and/or a device remote to computer device 102. In addition, camera resource 12 may capture one or more image frames 14 of a plurality of objects 15 up to m objects 15 (where m is a positive number) of scene 106. In an implementation, camera resource 12 may perform a bracketed image capture of the images frames 14. A bracketed image capture may include taking several image frames in succession of the same objects 15 of scene 106 using different camera settings, e.g., one or more focus-related parameters 18, for each of the image frames 14 captured to change the focus 16. The camera resource settings or one or more focus-related parameters 18 modified or offset (in the out of focus image 26) to change the focus 16 when taking the bracketed images may include, but are not limited to, the focus setting, the shutter speed, and/or the exposure, or among others. Further, a duration of the bracketed image capture may be as short as possible, e.g., to reduce movement of objects 15 in scene 106, or may be longer but accompanied by tracking of the movement of objects 15 so that corresponding objects or sections of the image can be correlated.

In addition, computer device 102 may include an operating system 110 executed by processor 42 and/or memory 41 of computer device 102. Memory 41 may be configured for storing data and/or computer-executable instructions defining and/or associated with operating system 110, and processor 42 may execute operating system 110. An example of memory 41 can include, but is not limited to, a type of memory usable by a computer, such as random access memory (RAM), read only memory (ROM), tapes, magnetic discs, optical discs, volatile memory, non-volatile memory, and any combination thereof. An example of processor 42 can include, but is not limited to, any processor specially programmed as described herein, including a controller, microcontroller, application specific integrated circuit (ASIC), field programmable gate array (FPGA), system on chip (SoC), or other programmable logic or state machine. Computer device 102 may include any mobile or fixed computer device, which may be connectable to a network. Computer device 102 may be, for example, a computer device such as a desktop or laptop or tablet computer, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices.

In an implementation, operating system 110 may include a camera driver 20 that receives image frames 14 from camera resource 12 and that allows interaction between camera resource 12 and operating system 110. Camera driver 20 may be a device driver that operates or controls a particular type of camera resource 12. In some examples, camera driver 20 may provide a software interface to the hardware of the camera resource 12, enabling the operating systems 110 and other computer programs to access the hardware functions without needing to know precise details of the hardware. For instance, the data of image frames 14 may be in the form of a series of image frames 14 received from camera resource 12. The series of image frames 14 may be provided at a certain frame rate. For example, the frame rate may be determined by the configuration of the device and the prevailing lighting conditions, as well as based on the bracketed image capture process described herein. Accordingly, camera driver 20 may provide the image frames 14 to operating system 110 in the form of the series of image frames 14.

In operation, in response to a request or command from application 10 to capture on or more images, camera driver 20 may send a request 21 to a variable photo sequence (VPS) component 22 to capture a plurality of images for a scene 106. The request 21 may be based on a lighting condition of the scene 106. For example, when the lighting condition is low (relative to normal lighting conditions), camera driver 20 may send the request 21 to VPS component 22 for a bracketed image capture of the scene 106. In addition, an application 10 may send a request 21 to the VPS component 22 to capture a plurality of images of the scene 106. For example, the application 10 may be capturing images in low light and may send a request via the camera driver 20 to VPS component 22 for a bracketed image capture of the scene 106. The request 21 may identify what setting(s) to vary in the image capture (e.g., focus, exposure, and shutter speed).

VPS component 22 may be operable to capture a plurality of images of the scene 106 in succession with different focus-related parameters for each of the captured images (e.g., the bracketed image capture). For example, VPS component 22 may vary a focus-related parameter such as the focus and/or exposure of each of the captured images.

In an example, VPS component 22 may lock a focus 16 of the camera resource 12 on one or more objects 15 in scene 106 to produce a clear image of the one or more objects 15 to define the in focus image 24. In addition, VPS component 22 may provide an offset to the focus 16, e.g., relative to a value of the focus 16 that defines the in focus image 24, to generate the one or more out of focus images 26. A value of the offset, e.g., a value of a change in one or more focus-related parameters, may depend on, for example, the depth of focus, aperture, and distance to the object in interest. For example, an object of interest may be determined when the camera resource 12 automatically selects a focus 16 and exposure settings for the object of interest. The offset may be a value that causes the entire object of interest to become out of focus (e.g., blurry). As such, for larger apertures, the offset may be a smaller value relative to an offset for smaller apertures. For smaller apertures the offset may be a larger value, if the objects of interest are near and not at infinity. For objects of interest at infinity (e.g., in a landscape), the offset may be smaller value relative to an offset for objects of interest closer to the camera resource 12. As such, VPS component 22 may capture a plurality of images of the same objects 15 in scene 106 with two or more focuses applied to the different images.

Figure 2A:
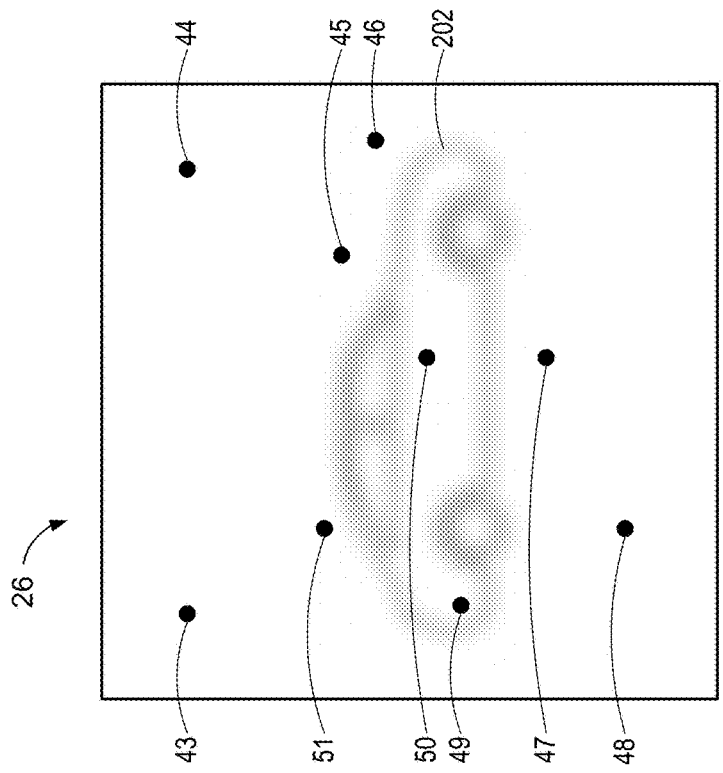
FIGS. 2A and 2B are examples of in focus image and an out of focus image in accordance with an implementation of the present disclosure.

FIG. 2A includes an example in focus image 24 that includes a car 202 as the subject of interest (e.g., the object 15) of the in focus image 24. The camera resource 12 may have locked the focus 16 on the car 202 and selected a focus setting to produce a clear image of the car 202. For example, camera resource 12 may receive an indication that the car 202 may be a region of interest in the scene 106 (FIG. 1) and may automatically set the focus 16 on the region of interest.

As illustrated, the in focus image 24 may include additional digital noise in the image, such as pixels 43-51. For example, if the in focus image 24 is captured in lower light conditions, the additional noise may be due to sensor noise produced when a higher ISO is used when capturing the in focus image 24. Other sensor noise may include, but is not limited to, temperature related noise (e.g., higher operating temperatures may result in higher noise relative to lower operating temperatures) and noise related to a size of the sensor (e.g., a smaller compact sensor in a mobile device may have more noise relative to a digital single-lens reflex (DSLR) sensor).

Figure 2B:
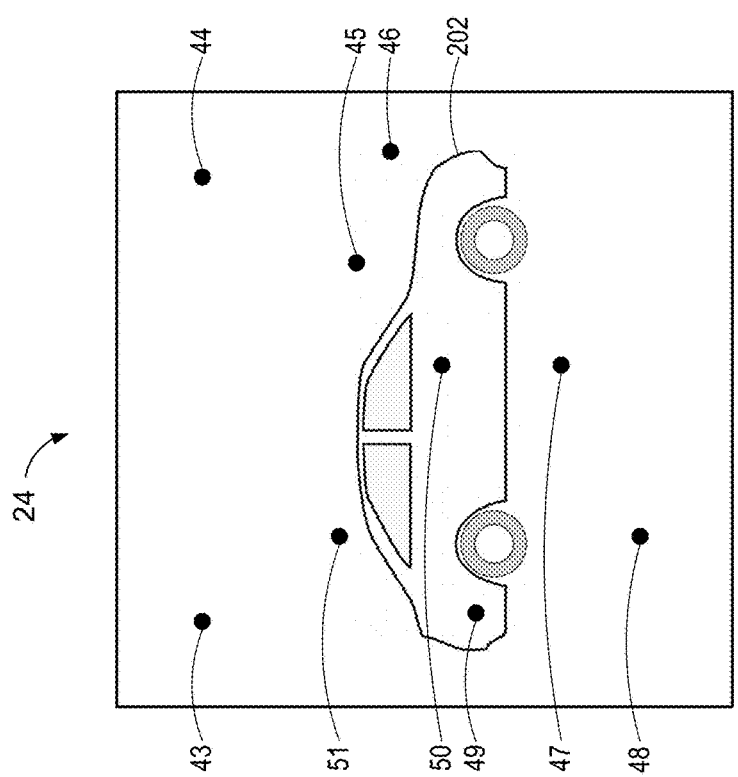

FIG. 2B includes an example out of focus image 26 corresponding to in focus image 24, where the out of focus image 26 includes a blurry subject of interest or object 15 (e.g., car 202). In an implementation, VPS component 22 may have modified a setting or value of the focus 16 used for the in focus image 24 (FIG. 2A) when capturing the out of focus image 26 so that the subject of interest (e.g., car 202) appears blurry. The additional noise (e.g., pixels 43-51) may be based on the sensor conditions selected (e.g., a higher ISO) and may be independent of the lens conditions. As such, the additional noise (e.g., pixels 43-51) may remain constant between the in focus image 24 and the out of focus image 26.

Referring back to FIG. 1, a noise estimator component 29 may receive the out of focus image 26 captured using the VPS component 22 and may use the out of focus image 26 to measure and/or estimate a noise model 30 of noise in the out of focus image 26. Noise in an image may include, but is not limited to, random intensity and/or color digital values appearing in the image pixels that are not part of the original scene 106. For instance, without the present solution, it may be difficult to differentiate noise versus texture in the captured image, but this solution allows such a differentiation since the texture will not be present in the out of focus image 38. The noise model 30 of the noise in the out of focus image 26 may vary in different regions in the out of focus image 26. In an implementation, the out of focus image 26 may be divided into sections and respective noise models 30 may be measured and/or estimated separately in each section.

In addition, rather than measuring/estimating the noise model 30 in the entire image, to increase efficiency and reduce resource usage, the noise model 30 may be measured and/or estimated in a region of interest 28 of the out of focus image 26. A region of interest 28 may include an area corresponding to one or more objects 15 of interest in scene 106. The region of interest 28 may include any image content identified as important by an application. For example, an application for a video call may consider one or many faces in the image a region of interest 28. In addition, a face detection application may consider a face of an individual as the region of interest 28. Other applications may receive a user defined region of interest (e.g., where a user selects a specially focused and/or metered region of the image). In addition, the region of interest may be a portion of an object which may be under a shadow or different lighting conditions. For example, the camera resource 12 may be focused on a region of interest 28 and the noise model 30 may be measured in the region of interest 28.

Figure 3:
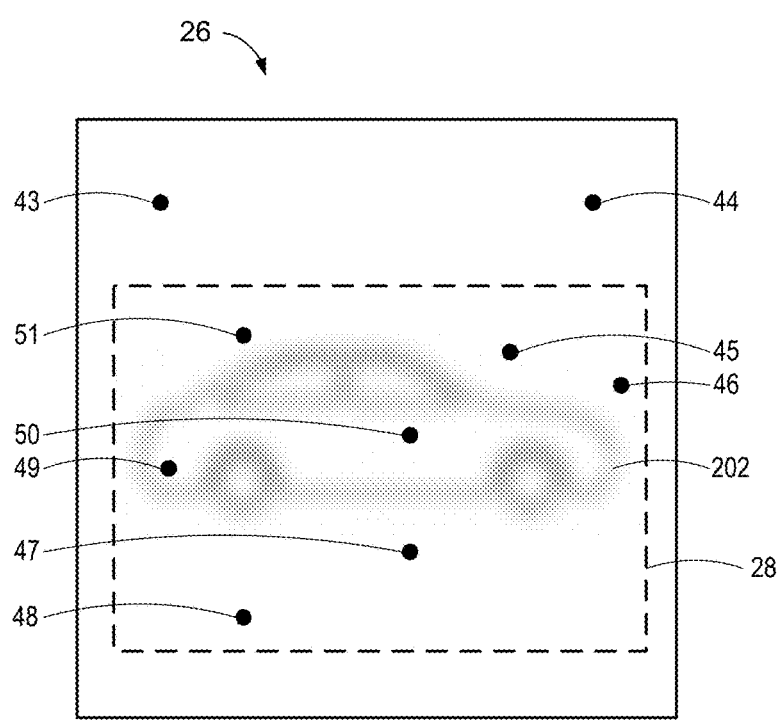
FIG. 3 is an example of noise included in a region of interest in an out of focus image in accordance with an implementation of the present disclosure.

Referring now to FIG. 3, illustrated is an example region of interest 28 (the dashed line) in the out of focus image 26. For example, the region of interest 28 may include the subject of the scene 106 (e.g., car 202). The region of interest 28 may include some subset of all of the noise (e.g., pixels 45-51) that is present in the entire image, such as noise in one or more locations near the subject of interest. Consequently, noise estimator component 29 (FIG. 1) may include a subset of the noise (e.g., pixels 45-51 in this example) from the entire image in the measured and/or estimated noise model 30 (FIG. 1) for the region of interest 28, and may exclude a subset of noise (e.g., pixels 43 and 44 in this example) outside of the region of interest 28. Pixels 43 and 44 may be included in a different noise estimation for the area of the image that includes pixels 43 and 44.

Referring back to FIG. 1, another implementation, noise estimator component 29 may measure and/or estimate the noise model 30 using a frequency analysis to determine a pixel intensity variance in the out of focus image 26. Noise estimator component 29 may apply a frequency transform to the in focus image 24 and the out of focus image 26 to determine the noise model 30 in the out of focus image 26. Frequency transforms may include, but are not limited to, a Discrete Fourier Transform (DFT), a Discrete Cosine/Sine Transform (DCT/DST), and a Hadamard Transform. For example, high frequency content identified in the noise model 30 of the out of focus image 26 may represent the noise in the image. A threshold may be derived using statistical methods to determine which content may be high frequency content (e.g., content above the threshold may be considered high frequency). In addition, a comparison may made between the differences in frequency response of the out-of-focus image 26 and in-focus image 24 to determine which content may be high frequency. The out of focus images 26 may be at the same frequency as the in focus image 24. As such, the frequency components which are consistent in both the out-of-focus image 26 and the in-focus image 24 images may be used to determine the threshold or a gradual noise suppression model instead of a threshold.

A noise reduction component 32 may receive the estimated and/or measured noise model 30 and may determine one or more parameter values for one or more filters 34 to apply to remove and/or reduce some portion or all of the noise components in the estimated and/or measured noise model 30 from one or more sections of the in focus image 24. Filters 34 may include, but are not limited to, spatial convolution filters (e.g., a finite impulse response (FIR) or infinite impulse response (IIR)) and frequency domain filters (which may involve suppressing frequency components by multiplication and/or division with quantization factors). The estimated and/or measured noise model 30 may be used to determine a value or range of the filter 34 and may also identify an intensity of different noise components in various sections of the in focus image 24. In an implementation, the filter 34 with one or more parameters set based on the noise model 30 may apply an inverse of the measured and/or estimated noise components of the noise model 30.

As such, the noise reduction component 32 may apply one or more filters 34 to respective sections of the in focus image 24, or a single filter 34 to the entire in focus image 24, to remove and/or reduce all or a part of the noise components of noise model 30 detected from the in focus image 24 and generate a noise-reduced image 38. As such, the noise components of noise model 30 removed and/or suppressed from all or sections of the in focus image 24 may vary for each section of the in focus image 24.

Figure 4:
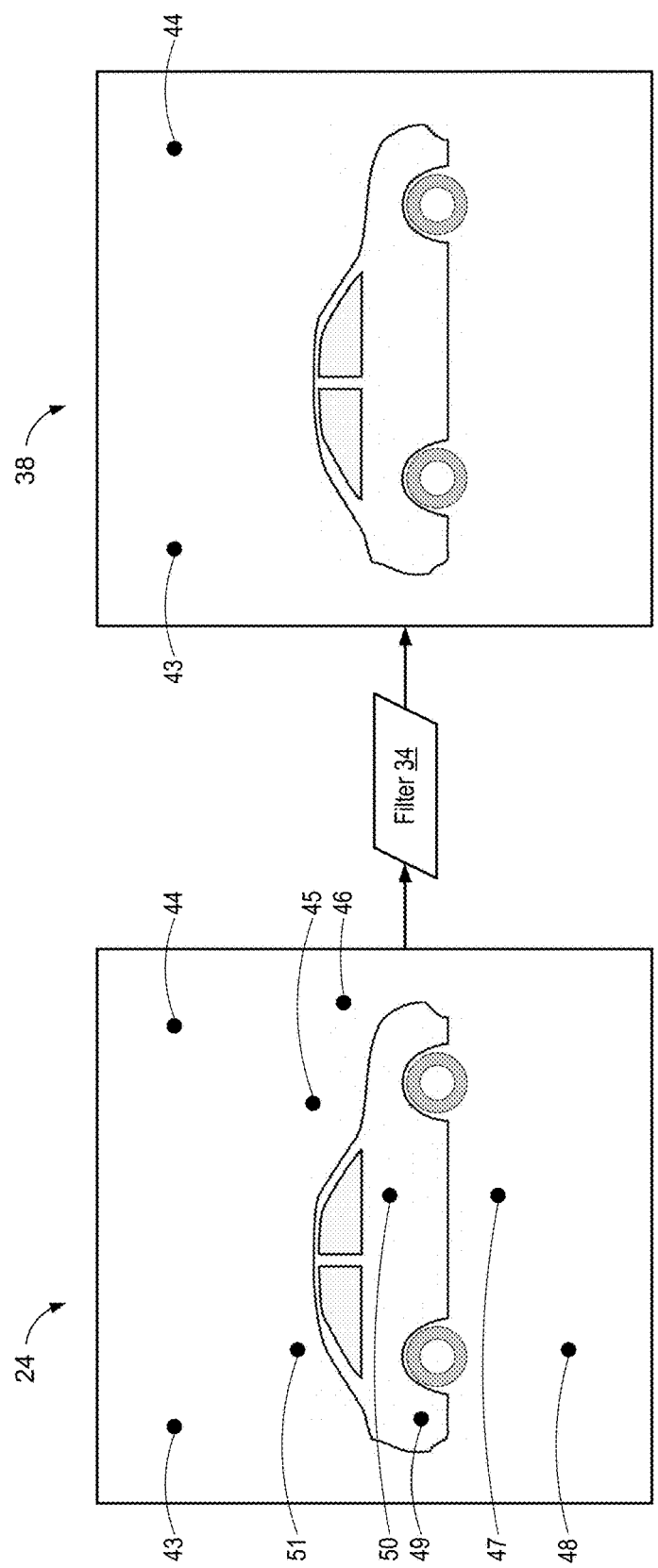
FIG. 4 is an example noised reduced image after a filter is applied to the in focus image in accordance with an implementation of the present disclosure.

Referring now to FIG. 4, an example of the noise-reduced image 38 is illustrated based on the noise model 30 (FIG. 1) estimated in a region of interest 28 (FIG. 3). As shown, the filter 34 having one or more parameter values based on the noise model 30 may be applied to the in focus image 24. The noise model 30 may identify one or more components of noise (e.g., pixels 45-51) in the region of interest 28 (FIG. 3). Correspondingly, filter 34 may be configured with one or more parameters, such as a frequency response and gain that are based on frequency and amplitude values of the noise components in the noise model 30. As such, filter 34 can be applied to the in focus image 24 and may remove and/or suppress or reduce one or more components of noise in the noise model 30 in the in focus image 24, resulting in the noise-reduced image 38. However, the filter 34 may not filter out some of the noise, e.g., pixels 43 and 44, because pixels 43 and 44 are in an area outside of the region of interest 28. As such, a different filter 34 may need to be applied to the in focus image 24 to remove and/or suppress pixels 43 and 44.

Referring back to FIG. 1, the noise-reduced image 38 may be transmitted to application 10 for further processing and/or storage. In addition, the noise-reduced image 38 may be presented on display 40. Thus, the noise-reduced image 38 (e.g., a clearer image of one or more objects 15 without noise or a reduced amount of noise) may be captured in low lighting conditions and provided to the camera application 10.

Figure 5:
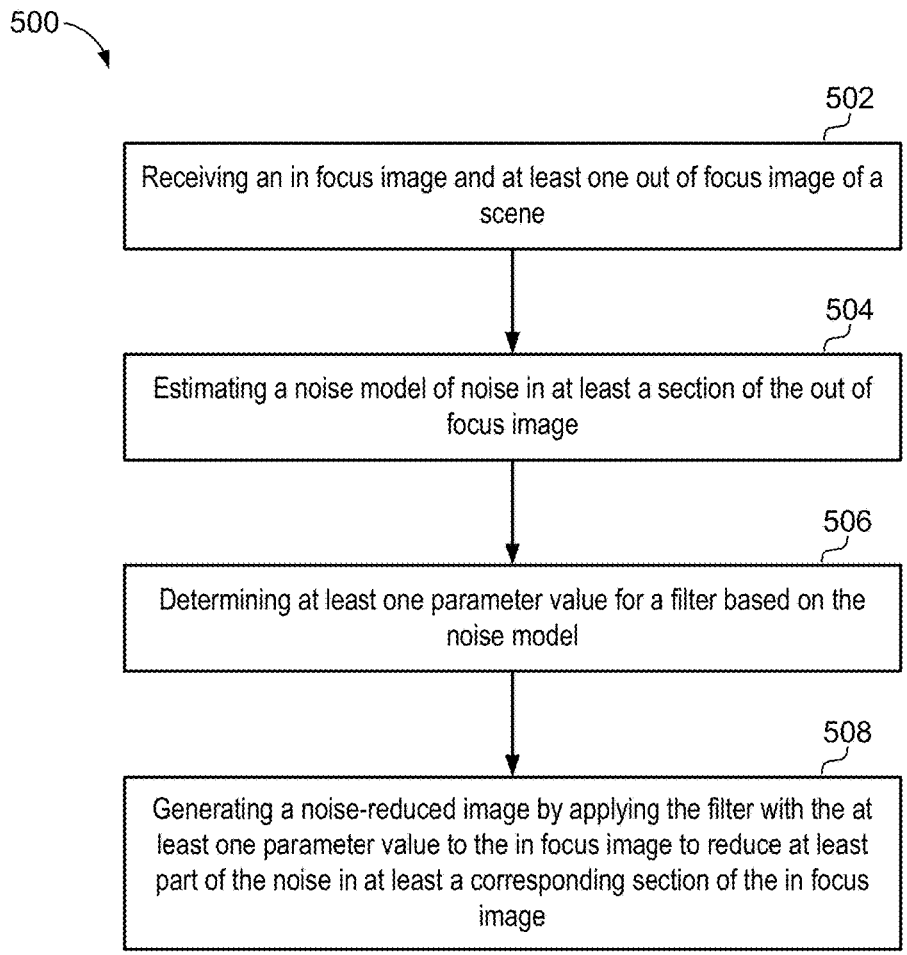
FIG. 5 is an example method flow for removing or reducing estimated noise from an in focus image in accordance with an implementation of the present disclosure.

Referring now to FIG. 5, a method 500 that may be used by computer device 102 (FIG. 1) for removing and/or reducing measured and/or estimated noise from an in focus image 24 (FIG. 1) includes various actions that may be performed by the operating system 110 or components thereof or components in communication with the operating system 110.

At 502, method 500 may include receiving an in focus image and at least one out of focus image of a scene, wherein the out of focus image has a second value of at least one focus-related parameter offset from a first value of the at least one focus-related parameter used for the in focus image. In an implementation, VPS component 22 may take a series of bracketed images of the scene 106 by varying at least the focus 16 of the camera resource 12 for the different images that are captured. VPS component 22 may vary the focus 16 by changing a value of at least one focus-related parameter, for instance, such that the out of focus image has a second value of at least one focus-related parameter offset from a first value of the at least one focus-related parameter used for the in focus image. Suitable focus-related parameters may include, but are not limited to, a focus value, a focal length, a setting of a lens distance, a size of an aperture, an amount of zoom, an exposure setting, a shutter speed, lighting conditions, an ISO value, or any combination thereof. As such, each of the images captured by VPS component 22 may have a different setting or value for the focus 16. For example, the VPS component 22 may capture the in focus image 24 of a scene 106 by locking the one or more focus-related parameter values to set the focus 16 of the camera resource 12 on the region of interest 28 in the scene 106. VPS component 22 may also capture the in focus image 24 by automatically selecting, e.g., using an autofocus (AF) optical system, the focus-related parameter value or setting of the focus 16 of the camera resource 12 to capture the scene 106. For example, camera resource 12 may identify one or more objects 15 in scene 106 and may set the focus-related parameter value or setting of the focus 16 on the one or more objects 15 identified. In addition, VPS component 22 may capture one or more out of focus images 26 of the scene 106 by modifying the selected focus 16 that defines the in focus image 24 of the camera resource 12 by an offset (e.g., a delta that provides a different value than the selected focus 16) to generate the one or more out of focus images 26. The value of the offset of the focus-related parameter value to use for the out of focus image should be enough to take the scene, region, or object of interest out of focus. It should be noted that different focus-related parameters may have different offset values, as a greater or less change may be needed to affect the focus depending on the particular focus-related parameter and/or the particular characteristics of what is in focus. For example, different adjustments to a size of aperture and an amount of zoom may be used when a depth of focus, e.g., in a three dimensional space, is relatively deep as compared to when the depth of focus is relatively narrow.

At 504, method 500 may include estimating a noise model of noise in at least a section of the out of focus image. Noise may be included in an image, for example but not limited to, when the image is captured in lower light conditions and/or a higher ISO is used to capture the image. In addition, the amount of noise and/or the intensity of noise in the image may vary in different sections in the image. As such, the estimated noise model may vary and change in different areas of the image.

For example, a noise estimator component 29 may estimate and/or measure the noise model 30 in at least a section, or in one or more regions of interest 28, of the one or more out of focus images 26. For example, the camera resource 12 may be focused on a region of interest 28 in the scene 106 (e.g., one or more objects 15) and the noise model 30 may be estimated in the region of interest 28. In addition, the noise estimator component 29 may divide the out of focus image 26 into a plurality of sections. The noise estimator component 29 may measure and/or estimate the noise model 30 for each of the plurality of sections or a selected area of the out of focus image 26.

In one implementation, noise estimator component 29 may apply a frequency transform to the signal of the out of focus image 24 to generate the noise model 30. In this case, the noise model 30 includes one or more frequency components and/or corresponding amplitudes representing the noise. Further, the noise model 30 may additionally reference the one or more frequency components and/or corresponding amplitudes representing the noise to respective regions or sections of the image, or different noise models 30 may be generated for different regions or sections of the image. For example, the noise model 30 may include a set of noise components (e.g., frequency components and/or amplitudes), where the set may include a plurality of frequency components spanning from one or more relatively low frequency components to one or more relatively high frequency components. In some case, the noise estimator component 29 may compare each of the set of noise components to a frequency threshold to identify what is considered as noise. For instance, in some cases, the identified noise may only correspond to the subset of the set of noise component, where the subset includes one or more of the relatively higher frequency components. For example, a threshold may be derived using statistical methods to determine which content may be high frequency content (e.g., content above the threshold may be considered high frequency).

In addition, a comparison may made between the differences in frequency response of the out-of-focus image 26 and in-focus image 24 to determine which content may be high frequency. For example, method 500 at 506 may including estimating a second noise model of noise in at least a section of the in focus image 24 corresponding to at least the section of the out of focus image 24 that is being analyzed, and identifying a common set of frequency components in the noise model of the out of focus image 24 and the second noise model of the in focus image 24. For example, since any high frequency components of objects or features of the scene of the image are not present in the out of focus image 24, since they are out of focus, the common set of frequency components in both noise models can be used to estimate the actual noise that is present in both corresponding images.

Another example may include the noise estimator component 29 using a frequency analysis to determine a pixel intensity variance in the out of focus image 26. For example, a frequency transform may be applied to the out of focus image 26 to determine the noise model 30 in the out of focus image 26. High frequency content identified in the out of focus image 26 may be identified by the noise model 30 and may represent the noise. For example, a threshold may be derived using statistical methods to determine which content may be high frequency content (e.g., content above the threshold may be considered high frequency). In addition, as mentioned above, a comparison may made between the differences in frequency response of the out-of-focus image 26 and in-focus image 24 to determine which content may be high frequency. The out of focus images 26 may be at the same frequency as the in focus image 24. As such, the frequency components which are consistent in both the out-of-focus image 26 and the in-focus image 24 images may be used to determine the threshold, or a gradual noise suppression model may be used instead of a threshold.

At 506, method 500 may include determining at least one parameter value for a filter based on the noise model. For example, a noise reduction component 32 may determine at least one parameter value for a filter 34 based on the noise model 30. Suitable examples of one or more parameter values of the filter 34 include, but are not limited to, a gain, a frequency or frequency band, a phase response, a non-linear factor, or any combination thereof. The noise model 30 includes one or more frequency components and/or amplitudes, which may be used to determine a value or range of one or more parameters to set for the filter 34. For example, the filter 34 may be set with parameter values based on the noise model 30 such that the filter 34 applies an inverse of the estimated and/or measured noise components of the noise model 30 to the in focus image 24.

At 508, method 500 may include generating a noise-reduced image by applying the filter with the at least one parameter value to the in focus image to reduce at least part of the noise in at least a corresponding section of the in focus image. For example, the noise reduction component 32 may apply the filter 34 to respective portions of the in focus image 24 based on the measured and/or estimated noise model 30 and may generate a noise-reduced image 38. The noise-reduced image 38 may remove and/or suppress one or more frequency components identified by the noise model 30. The amount of visible noise (e.g., noise that can be seen in an image) reduced from the portions of the in focus image 24 may vary based on the noise model 30 for each portion of the in focus image 24.

Thus, when operating on different corresponding sections of each of the out of focus image 24 and the in focus image 24, the method 500 operates to divide the out of focus image into a plurality of sections, to apply a frequency transform to each of the plurality of sections to identify one or more frequency components and amplitudes of the noise in the respective section, and to identify a frequency spread of the one or more frequency components and amplitudes of the noise in the respective section. Further, the method 500 may identify for removal at least a portion of the frequency spread of the one or more frequency components and amplitudes of the noise in each of the plurality of sections, e.g., based on comparing the value of the frequency components to a threshold. Further, the method 500 operates to determine a respective one or more parameter values for the filter corresponding to at least the portion of the frequency spread of the one or more frequency components and amplitudes of the noise in each of the plurality of sections, and to apply the filter with the respective one or more parameter values to at least a corresponding one of each of a plurality of sections of the in focus image.

Figure 6:
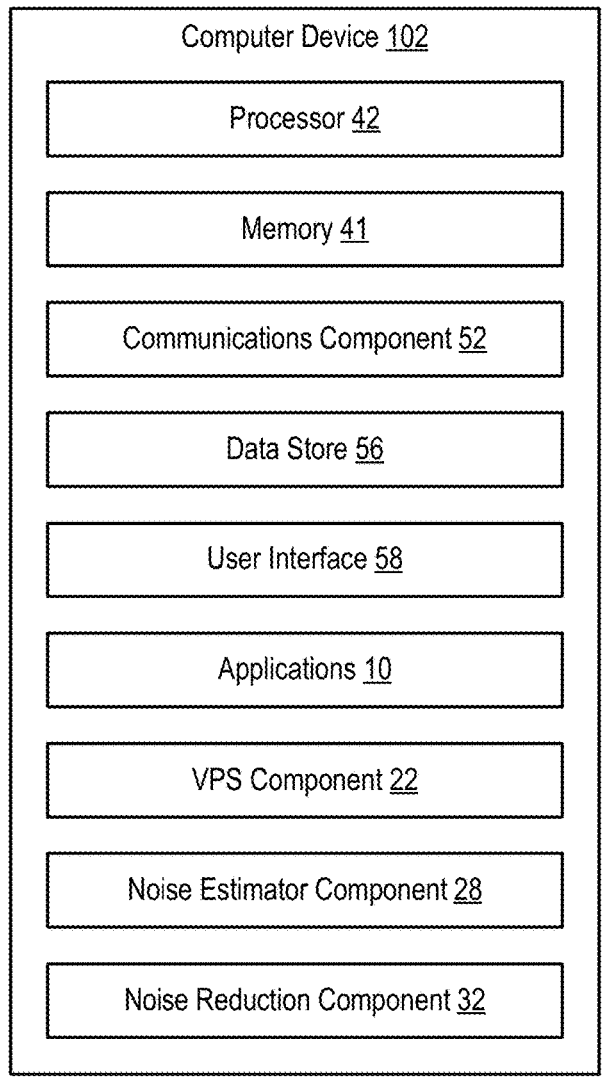
FIG. 6 is a schematic block diagram of an example device in accordance with an implementation of the present disclosure.

Referring now to FIG. 6, illustrated is an example computer device 102 in accordance with an implementation, including additional component details as compared to FIG. 1. In one example, computer device 102 may include processor 42 for carrying out processing functions associated with one or more of components and functions described herein. Processor 42 can include a single or multiple set of processors or multi-core processors. Moreover, processor 42 can be implemented as an integrated processing system and/or a distributed processing system.

Computer device 102 may further include memory 41, such as for storing local versions of applications being executed by processor 42. Memory 41 can include a type of memory usable by a computer, such as random access memory (RAM), read only memory (ROM), tapes, magnetic discs, optical discs, volatile memory, non-volatile memory, and any combination thereof. Additionally, processor 42 and memory 41 may include and execute operating system 110 (FIG. 1).

Further, computer device 102 may include a communications component 52 that provides for establishing and maintaining communications with one or more parties utilizing hardware, software, and services as described herein. Communications component 52 may carry communications between components on computer device 102, as well as between computer device 102 and external devices, such as devices located across a communications network and/or devices serially or locally connected to computer device 102. For example, communications component 52 may include one or more buses, and may further include transmit chain components and receive chain components associated with a transmitter and receiver, respectively, operable for interfacing with external devices.

Additionally, computer device 102 may include a data store 56, which can be any suitable combination of hardware and/or software, that provides for mass storage of information, databases, and programs employed in connection with implementations described herein. For example, data store 56 may be a data repository for applications 10 (FIG. 1), VPS component 22 (FIG. 1), noise estimator component 29 (FIG. 1), and/or noise reduction component 32 (FIG. 1).

Computer device 102 may also include a user interface component 58 operable to receive inputs from a user of computer device 102 and further operable to generate outputs for presentation to the user. User interface component 58 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 58 may include one or more output devices, including but not limited to a display, a speaker, a haptic feedback mechanism, a printer, any other mechanism capable of presenting an output to a user, or any combination thereof.

In an implementation, user interface component 58 may transmit and/or receive messages corresponding to the operation of applications 10, VPS component 22, noise estimator component 29, and/or noise reduction component 32. In addition, processor 42 executes applications 10, VPS component 22, noise estimator component 29, and/or noise reduction component 32 and memory 41 or data store 56 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device, comprising:
    a memory to store data and instructions;
    a processor in communication with the memory;
    an operating system in communication with the memory and the processor, wherein the operating system is operable to:
        receive an in focus image and at least one out of focus image of a scene, wherein the out of focus image has a second value of at least one focus-related parameter offset from a first value of the at least one focus-related parameter used for the in focus image;
        estimate a noise model of noise in at least a section of the out of focus image based at least in part on identifying a frequency spread of one or more frequency components and amplitudes of the noise;
        determine at least one parameter value for a filter based on the noise model; and
        generate a noise-reduced image by applying the filter with the at least one parameter value to the in focus image to reduce at least part of the noise in at least a corresponding section of the in focus image.

2. The computer device of claim 1, wherein the operating system is further operable to estimate the noise model by using a frequency analysis to determine a pixel variance in at least the section of the out of focus image.

3. The computer device of claim 2, wherein the frequency analysis includes a frequency transform applied to the out of focus image to identify frequency components and corresponding amplitudes of the noise in at least the section of the out of focus image.

4. The computer device of claim 1, wherein to generate the noise-reduced image, the operating system is further operable to:
    determine one or more regions of interest of the out of focus image;
    estimate a respective noise model of the noise for each of the one or more regions of interest;
    determine one or more respective parameter values for the filter for each of the one or more regions of interest based on the respective noise model for each of the region of interests; and
    apply the filter with the one or more respective parameter values to a corresponding region of interest in the in focus image.

5. The computer device of claim 1, wherein to estimate the noise model of the noise in the out of focus image, the operating system is further operable to:
    divide the out of focus image into a plurality of sections;
    apply a frequency transform to each of the plurality of sections to identify the one or more frequency components and the amplitudes of the noise in the respective section; and
    identify the frequency spread of the one or more frequency components and the amplitudes of the noise in the respective section.

6. The computer device of claim 5, wherein to generate the noise-reduced image, the operating system is further operable to:
    identify for removal at least a portion of the frequency spread of the one or more frequency components and amplitudes of the noise in each of the plurality of sections;
    determine a respective one or more parameter values for the filter corresponding to at least the portion of the frequency spread of the one or more frequency components and amplitudes of the noise in each of the plurality of sections; and
    apply the filter with the respective one or more parameter values to at least a corresponding one of each of a plurality of sections of the in focus image.

7. The computer device of claim 1, wherein the filter with the at least one parameter value applies an inverse of at least a portion of noise components of the noise identified by the noise model.

8. The computer device of claim 1, wherein the in focus image and the out of focus image are captured in low light.

9. The computer device of claim 1, wherein the operating system is further operable to:
    estimate a second noise model of noise in at least a section of the in focus image corresponding to at least the section of the out of focus image, wherein the noise model of the out of focus image and the second noise model of the in focus image include frequency components;
    identify a common set of frequency components in both the noise model of the out of focus image and the second noise model of the in focus image;
    wherein to determine the at least one parameter value for the filter the operating system is further operable to determine one or more parameter values based on the common set of frequency components; and
    wherein to generate the noise-reduced image, the operating system is further operable to apply the filter with the one or more parameter values to the in focus image.

10. The computer device of claim 1, wherein an amount of noise removed from portions of the in focus image varies based on a measured noise for each portion of the in focus image.

11. A method for reducing noise in an image, comprising:
    receiving, at an operating system executing on a computer device, an in focus image and at least one out of focus image of a scene, wherein the out of focus image has a second value of at least one focus-related parameter offset from a first value of the at least one focus-related parameter used for the in focus image;
    estimating, by the operating system, a noise model of noise in at least a section of the out of focus image based at least in part on identifying a frequency spread of one or more frequency components and amplitudes of the noise;
    determining at least one parameter value for a filter based on the noise model; and
    generating a noise-reduced image by applying the filter with the at least one parameter value to the in focus image to reduce at least part of the noise in at least a corresponding section of the in focus image.

12. The method of claim 11, wherein estimating the noise model further comprises using a frequency analysis to determine a pixel variance in at least the section of the out of focus image.

13. The method of claim 12, wherein the frequency analysis includes a frequency transform applied to the out of focus image to identify frequency components and corresponding amplitudes of the noise in at least the section of the out of focus image.

14. The method of claim 11, wherein estimating the amount of noise further comprises:
    determining one or more regions of interest of the out of focus image;
    estimating a respective noise model of the noise for each of the one or more regions of interest;
    determining one or more respective parameter values for the filter for each of the one or more regions of interest based on the respective noise model of the noise for each of the region of interests; and
    applying the filter with the one or more respective parameter values to a corresponding region of interest in the in focus image.

15. The method of claim 11, wherein estimating the amount of noise in the out of focus image further comprises:
    dividing the out of focus image into a plurality of sections;
    applying a frequency transform to each of the plurality of sections to identify the one or more frequency components and the amplitudes of the noise in the respective section; and
    identifying the frequency spread of the one or more frequency components and the amplitudes of the noise in the respective section.

16. The method of claim 15, wherein generating the noise-reduced image further comprises:
    identifying for removal at least a portion of the frequency spread of the one or more frequency components and amplitudes of the noise in each of the plurality of sections;
    determining a respective one or more parameter values for the filter corresponding to at least the portion of the frequency spread of the one or more frequency components and amplitudes of the noise in each of the plurality of sections; and
    applying the filter with the respective one or more parameter values to at least a corresponding one of each of a plurality of sections of the in focus image.

17. The method of claim 11, wherein the filter with the at least one parameter value applies an inverse of at least a portion of noise components of the noise identified by the noise model.

18. The method of claim 11, wherein the in focus image and the out of focus image are captured in low light.

19. The method of claim 11, further comprising:
    estimating a second noise model of noise in at least a section of the in focus image corresponding to at least the section of the out of focus image, wherein the noise model of the out of focus image and the second noise model of the in focus image include frequency components;
    identifying a common set of frequency components in both the noise model of the out of focus image and the second noise model of the in focus image;
    wherein determining the at least one parameter value for the filter further comprises determining one or more parameter values based on the common set of frequency components; and
    wherein generating the noise-reduced image further comprises applying the filter with the one or more parameter values to the in focus image.

20. The method of claim 11, wherein an amount of noise removed from portions of the in focus image varies based on a measured noise for each portion of the in focus image.

21. A non-transitory computer-readable medium instructions executable by a computer device, comprising:
    at least one instruction for causing the computer device to receive an in focus image and at least one out of focus image of a scene, wherein the out of focus image has a second value of at least one focus-related parameter offset from a first value of the at least one focus-related parameter used for the in focus image;
    at least one instruction for causing the computer device to estimate a noise model of noise in at least a section of the out of focus image based at least in part on identifying a frequency spread of one or more frequency components and amplitudes of the noise;
    at least one instruction for causing the computer device to determine at least one parameter value for a filter based on the noise model; and
    at least one instruction for causing the computer device to generate a noise-reduced image by applying the filter with the at least one parameter value to the in focus image to reduce at least part of the noise in at least a corresponding section of the in focus image.

22. The computer-readable medium of claim 21, further comprising:
    at least one instruction for causing the computer device to divide the out of focus image into a plurality of sections;
    at least one instruction for causing the computer device to apply a frequency transform to each of the plurality of sections to identify the one or more frequency components and the amplitudes of the noise in the respective section;
    at least one instruction for causing the computer device to identify the frequency spread of the one or more frequency components and the amplitudes of the noise in the respective section;
    at least one instruction for causing the computer device to identify for removal at least a portion of the frequency spread of the one or more frequency components and amplitudes of the noise in each of the plurality of sections;
    at least one instruction for causing the computer device to determine a respective one or more parameter values for the filter corresponding to at least the portion of the frequency spread of the one or more frequency components and amplitudes of the noise in each of the plurality of sections; and
    at least one instruction for causing the computer device to apply the filter with the respective one or more parameter values to at least a corresponding one of each of a plurality of sections of the in focus image.

* * * * *